(Model.)
T. M. BRINTNALL.
BLIND STOP.
No. 274,881. Patented Mar. 27, 1883.
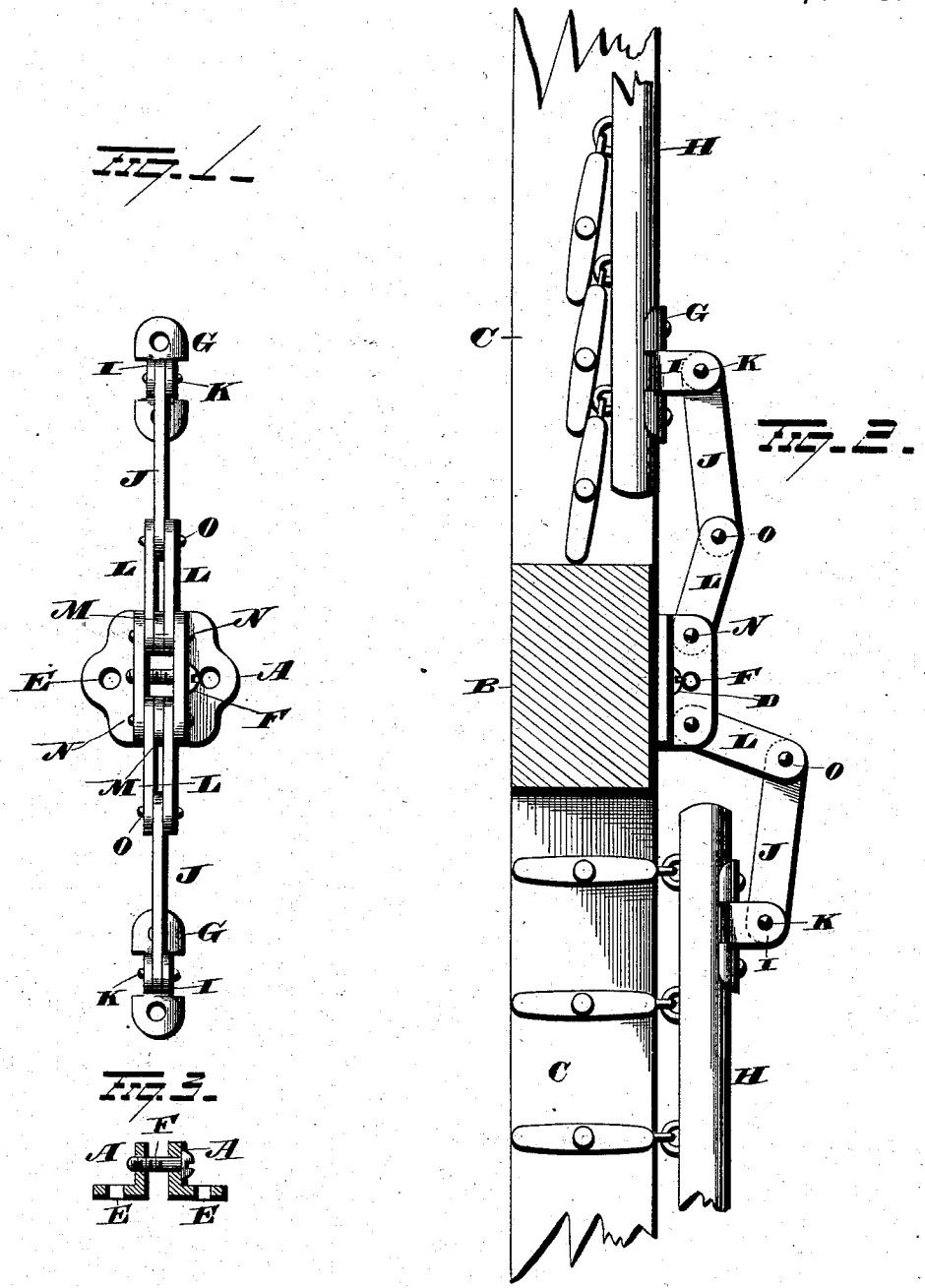
WITNESSES
INVENTOR
Thomas M. Brintnall
Attorney

UNITED STATES PATENT OFFICE.

THOMAS M. BRINTNALL, OF KANSAS CITY, MISSOURI.

BLIND-STOP.

SPECIFICATION forming part of Letters Patent No. 274,881, dated March 27, 1883.

Application filed October 24, 1882. (Model.)

*To all whom it may concern:*

Be it known that I, THOMAS M. BRINTNALL, a citizen of the United States, residing in Kansas City, county of Jackson, and State of Missouri, have invented a new and useful Blind-Stop, of which the following is a specification.

My invention relates to an improvement in devices for regulating the adjustment of the slats of window-blinds, the object being to provide a device of the character designated which shall combine simplicity and cheapness of construction with durability and efficiency in use. With these objects in view my invention consists in certain details of construction and combinations of parts, as will be hereinafter described, and pointed out in the claims.

In the accompanying drawings, Figure 1 is a plan view of a device embodying my invention. Fig. 2 is a view of the device in side elevation, showing it as applied to a blind; and Fig. 3 is a view in central transverse section of the blind-frame bearings.

The adjustable flange-bearings A are secured to the central cross-piece, B, of the blind C by means of screws D, passing through suitable holes, E, formed in the bearings, which are relatively adjusted by the screw F in any suitable manner.

The slat-rod bearing is formed from a single piece of metal. It consists of perforated end sections, G, which are bent to conform to the shape of the slat-rod H, and of upright leaves I, between which the outer section, J, of the jointed arm is pivoted by a pivot, K. The inner section, L, of the said arm is composed of two similar parts, their inner ends being separated by a washer, M, and pivoted between the adjustable bearings A by a pivot, N. The two sections of the arm are united by a pivot, O, which holds the inner end of the outer section between the outer ends of the two parts of the inner section, as shown. By virtue of its construction the said arm has a wrist, elbow, and shoulder motion, allowing the slat-rod to be moved vertically and laterally, the rod, together with the slats attached to it, being held in any desired adjustment by the friction between the section L of the arm and the flanged bearings A, this friction being obtained and regulated by the screw F.

To compensate for the wear of friction the holes E of the bearings A should be made a little large, or sufficiently oblong to permit a slight range of lateral adjustment in the bearings.

The device shown in the drawings is a double one, being arranged to adjust both the upper and lower set of slats; but the adjustment of the upper and lower slats may be effected by separate devices, if desired. In many cases separate devices will be preferable to the double ones.

Having fully described my invention, what I claim as new, and desire to secure by Letters Patent, is—

1. The combination, with the frame and slat-rod of a window-blind, of bearings secured to the said parts, and a jointed arm having its opposite ends respectively pivoted to said bearings, one joint of the arm being arranged to constitute a friction-brake, substantially as set forth.

2. The combination, with the frame and slat-rod of a window-blind, of two adjustable bearings attached to the blind-frame, a screw uniting and arranged to vary the relative adjustment of said bearings, a bearing attached to the slat-rod, and a jointed arm the ends of which are respectively pivoted between the bearings attached to the blind-frame and to the slat-rod bearing, substantially as set forth.

THOMAS M. BRINTNALL.

Witnesses:
CARTER W. BRYAN,
RICHD. A. MELONE.